United States Patent [19]

Pickle

[11] 4,125,346
[45] Nov. 14, 1978

[54] RANDOM WAVE HYDRAULIC ENGINE

[76] Inventor: William H. Pickle, Knoxville, Tenn.

[21] Appl. No.: 767,732

[22] Filed: Feb. 11, 1977

Related U.S. Application Data

[63] Continuation-in-part of Ser. No. 622,764, Oct. 15, 1975, abandoned.

[51] Int. Cl.² ........................ F04B 17/00; F04B 21/02
[52] U.S. Cl. .................................. 417/332; 417/534; 60/506
[58] Field of Search ............... 417/332, 534, 333, 331; 60/506; 290/42, 53

[56] References Cited

U.S. PATENT DOCUMENTS

| | | | |
|---|---|---|---|
| 235,105 | 12/1880 | Speakman | 417/331 |
| 1,766,467 | 6/1930 | Ruth | 417/332 |
| 2,477,691 | 8/1949 | Griffin | 417/332 |
| 2,834,298 | 5/1958 | Wright et al. | 417/534 X |
| 4,023,515 | 5/1977 | Tharaldson | 417/332 X |

FOREIGN PATENT DOCUMENTS

566,691 1/1945 United Kingdom.

*Primary Examiner*—Carlton R. Croyle
*Assistant Examiner*—R. E. Gluck
*Attorney, Agent, or Firm*—Pitts, Kressin & Kesterson

[57] ABSTRACT

A pumping apparatus actuated by waves in a large body of water for pumping water to a remote location. The pumping apparatus is bouyant and comprises a barge structure carrying a compression system having a plurality of pumping units disposed substantially colinearly along the length of the barge structure. The pumping units are actuated by float members which rise and fall responsive to waves in the water body in which the pumping apparatus is disposed. To this end, each of the float members is connected to a piston head of one of the pumping units through a linkage system. Actuation of the piston heads serves to force water under pressure through a suitable discharge pipe to a remote location such as a reservoir where the water can be converted into a usable form of energy.

2 Claims, 14 Drawing Figures

RANDOM WAVE HYDRAULIC ENGINE

This application is a continuation-in-part of application Ser. No. 622,764 filed Oct. 15, 1975, now abandoned.

This invention relates to a pumping apparatus and more particularly concerns a pumping apparatus acutated by waves in a large body of water and which is adapted for pumping water in which the apparatus is disposed to a remote location such as a reservoir.

The waves in large bodies of water provide a ready source of energy which, if harnessed, can be converted into conventional energy forms such as electricity. To this end, various attempts have been made in the past to harness the energy produced by the undulations or waves at the surface of large bodies of water. For example, one prior art apparatus is disclosed in the patent to J. B. Greiner, U.S. Pat. No. 582,282. The apparatus disclosed by Greiner comprises a motor consisting of a substantially circular platform which carries a plurality of compressors disposed on the platform at annularly spaced locations around a substantially centrally located reservoir with which the compressors communicate through valved pipes. Floats are disposed in guides connected to the platform opposite each of the compressors and are joined with the compressors through connected levers and rods.

A further prior art apparatus adapted for utilizing the energy produced by waves is disclosed in U.S. Pat. No. 2,477,691 to E. M. Griffin. This apparatus discloses a compressed air plant including a floating barge having a plurality of air compressors mounted in pairs upon and in the deck of the barge. A lever mounted upon a fulcrum between each pair of the air compressors is pivoted about the fulcrum point responsive to the rising and falling of pontoons which are connected to one end of the lever through a suitable rod.

Certain prior art systems adapted for utilizing the energy produced by waves in a large body of water suffer certain disadvantages, however. For example, certain systems incorporate complex valving devices which must be intermittently replaced in that the pressure generated in the compression chambers tends to damage the moving parts of these devices. Moreover, the prior art systems are designed primarily for compressing low density fluids such as air and are not particularly adapted for moving liquids to remote locations at which the liquid can be converted into conventional forms of energy such as electricity, or used for irrigation.

It is therefore, an object to this invention to provide an apparatus which assists in harnessing the energy produced by waves at the surface of a large body of water by pumping water to a remote location such as a reservoir where the water may be converted into conventional forms of energy such as electricity, for example. It is a further object of the invention to provide such an apparatus incorporating a plurality of independent pumping units which serve to pump the liquid within which the pumping apparatus is disposed to a remote location such as a reservoir.

Other objects and advantages of the present invention will become apparent upon reading the detailed specification together with the drawings wherein.

In accordance with various features of the invention there is provided a pumping apparatus which serves to assist in harnessing the energy produced by waves at the surface of a large body of water. More specifically, the pumping apparatus disclosed in the Figures includes a floating barge structure having a substantially planar upper deck which is connected along its marginal edges to a barge hull disposed within a supporting fluid such as water. The barge structure is preferably moored to the floor of the ocean or a suitable stationary structure and carries a plurality of pumping units that serve to pump the liquid in which the pumping apparatus is disposed to a remote location such as a reservoir. Each of the pumping units includes a cylinder having a slideably mounted piston, positioned within the cylinder, having a piston head connected through a rod to a suitable lever which is actuated by movement of float members disposed within water adjacent the barge structure. In accordance with one feature, each of these cylinders is disposed within a bulkhead which communicates with a suitable manifold collection discharge pipe which serves to carry water exiting the pumping units to a remote location.

Figure 1:
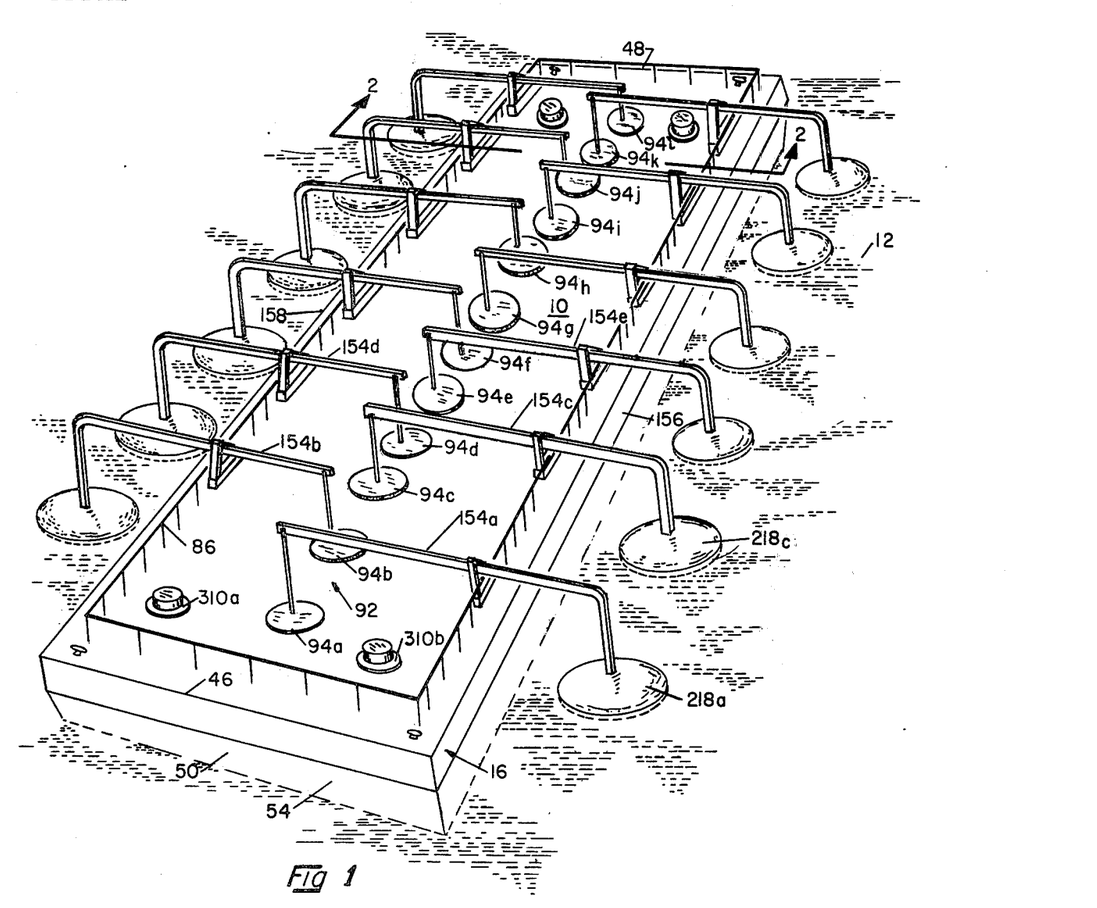
FIG. 1 is a perspective view of a pumping apparatus constructed in accordance with various features of the invention.

Referring now to the drawings, a pumping apparatus generally indicated at 10 in FIG. 1 is shown floating in a large body of water within the vicinity of the shoreline 14 where the apparatus is moored. The illustrated pumping apparatus 10 is particularly adapted for being positioned in an ocean or suitable large fresh water lake, for example, which has substantial wave activity. It is desirable that the waves at the surface of the water body 12 within which the pumping apparatus 10 is disposed reach a height of at least 3 or 4 feet.

Figure 2:
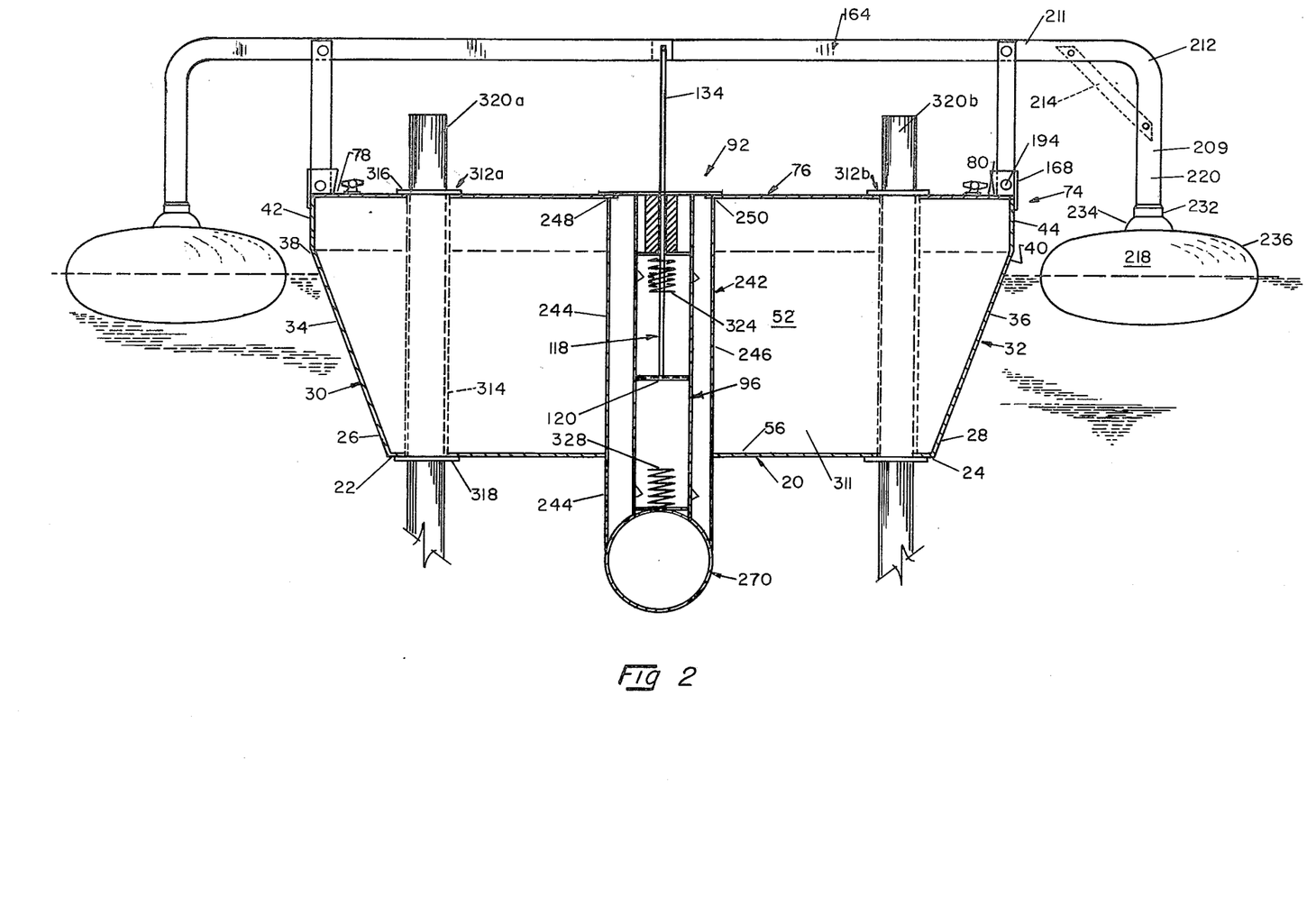
FIG. 2 is a sectional view taken along line 2—2 of FIG. 1.
Figure 3:
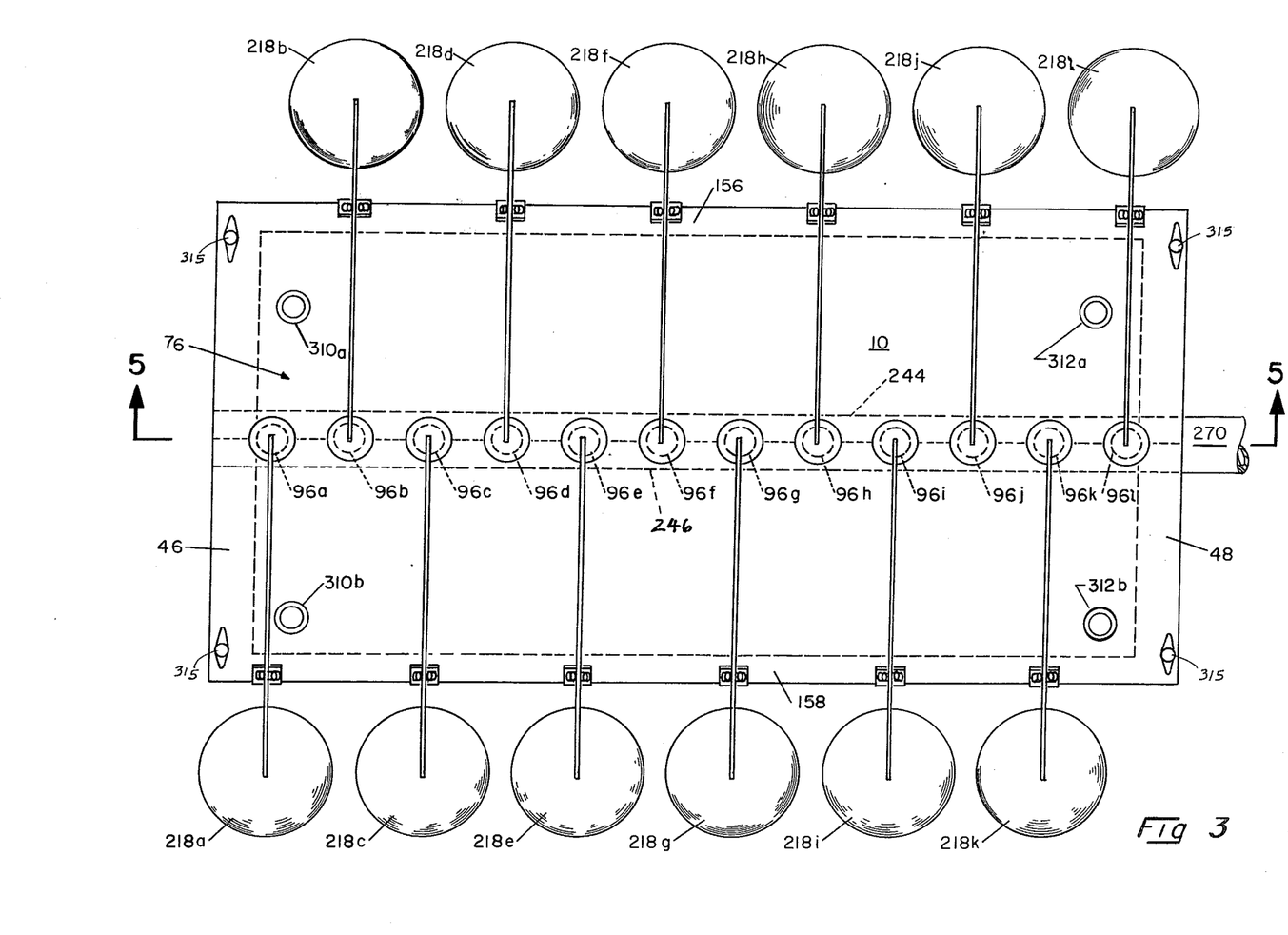
FIG. 3 is a diagrammatic plan view of the apparatus shown in FIG. 1.

The illustrated pumping apparatus 10 shown in FIGS. 1 and 2 includes a barge structure 16 having a hull 18 which is substantially rectangular in configuration and fabricated from a suitable rigid material such as metal. The hull 18 includes a substantially rectangular lower wall 20 which is joined along its opposite side margins 22 and 24 respectively to lower marginal edges 26 and 28 of sidewalls 30 and 32, respectively. These sidewalls 30 and 32 include outwardly sloped panels 34 and 36 which are integrally formed along their upper edges 38 and 40, respectively, with substantially upright sidewall panels 42 and 44.

Figure 4:
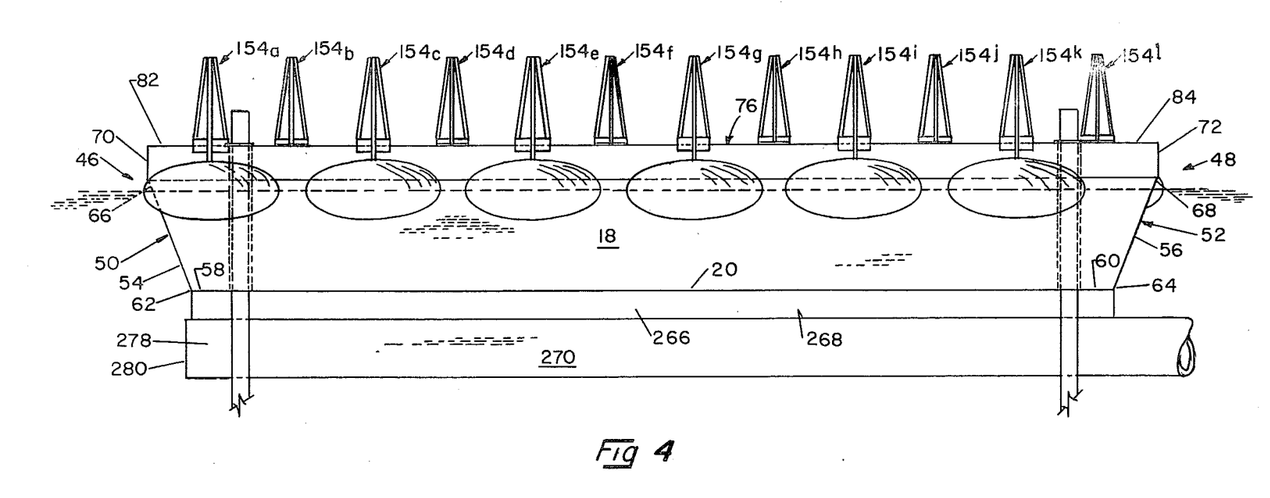
FIG. 4 is a diagrammatic side elevation view of the apparatus shown in FIG. 1.

The opposite ends 46 and 48 of the barge structure 16 are closed by the end walls 50 and 52 which are joined along their lower portions 54 and 56, respectively, to the opposite ends 58 and 60 of the lower wall 20. As shown in FIG. 4 the lower portions 54 and 56 of the opposite end walls 50 and 52, respectively, are sloped outwardly from their lower edges 62 and 64 and joined along their upper edges 66 and 68 to substantially upright end portions 70 and 72 of the end walls 50 and 52, respectively to define an open-topped hull 18 which is adapted for floating in the water body 12.

The hull 18 is closed along its top portion 74 by a suitable deck 76 which is substantially planar and fabricated from a suitable rigid panel which is joined along its marginal edges 78 and 80 to the upper marginal edges of the upright sidewall panels 42 and 44. The opposite end portions 82 and 84 of the deck 76 are joined with the upper portions 70 and 72 of the opposite end walls 50 and 52 respectively.

In the illustrated embodiment, the barge structure 16 is adapted for supporting persons walking on the deck 76 and in this connection a suitable safety rail 86 is mounted in a substantially upright position along the perimeter of the deck to assist in preventing persons walking on the deck from accidentally falling into the water as during violent waves.

In order to pump a portion of water 12 from the pumping apparatus 10 to a remote location such as the reservoir 90, which is preferably disposed at a higher elevation than the pumping apparatus, a pumping system generally indicated at 92 is provided. The pumping system 92 includes a plurality of independent pumping units 94 a–l, which in the illustrated embodiment are disposed at spaced locations in a substantially colinear relationship along the midportion of the barge structure 16. Each of the pumping units 94 a–l includes a cylinder 96 (See FIG. 6) which is defined by a substantially cylindrical wall 98 disposed in an upright position and secured along its upper end portion 100 to the marginal edge 102 of a circular opening 104 provided in the barge deck 76. The cylinder 96 is proportioned such that its lower portion 106 extends below the lower wall 20 of the barge structure 16. The cylinder 96 is closed at its opposite ends 108 and 110 by the substantially circular plates 112 and 114 to define a chamber 116.

A piston 118 is slidably mounted in the chamber 116 and includes a piston head 120 which serves to partition the chamber 116 into separate sections 116a and 116b. More specifically, the piston head 120 includes a pair of substantially circular plates 122 and 124 which are proportioned for moving along the length of the cylinder 96. These plates 122 and 124 are bolted together by annularly spaced bolts 126, for example. A flexible seal 128 is interposed between the plates 122 and 124 and serves to sealably engage the inner surface 130 of the cylinder 96 to assist in preventing water from passing from between sections 116a and 116b of the chamber 116 around the perimeter of the piston head 120. In this connection, the bolts 126 serve to urge the outer edge of the seal 128 into engagement with the inner surface 130 of the cylinder.

Figure 6:
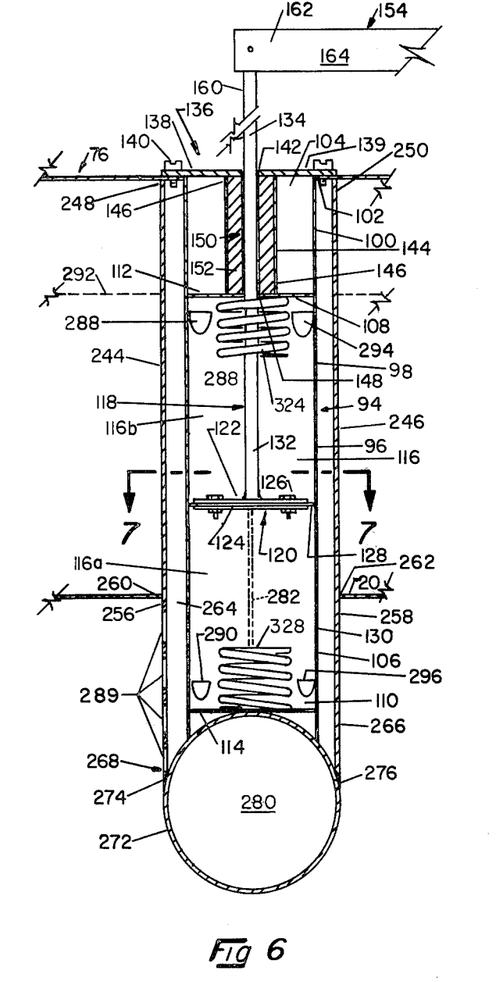
FIG. 6 is a cross sectional view of one of the pumping units shown in FIG. 5.

As shown in FIG. 6, the central portion of the piston head 120 is secured as by welding to distal end 132 of the piston rod 134 disposed substantially along the axis of the cylinder 96.

The rod 134 is slidably received in a rod sleeve guide 136 which serves to maintain the movement of the rod 134 substantially along the longitudinal axis of the cylinder. More specifically, the rod sleeve guide 136 comprises a substantially circular plate 138 fabricated from a rigid material such as sheet metal and secured along its perimeter 139, as by annularly spaced screws 140, to the marginal edge 102 of the deck 76 defining opening 104. An opening 142 is defined by the plate 138 substantially centrally thereof and adapted for slidably receiving the rod 134 extending therethrough. A substantially cylindrical sleeve 144 is secured along its upper end 146 to the plate 138 such that the opening 142 registers with the interior of the sleeve 144. This sleeve 144 is partially closed at its opposite end 146 by the circular plate 112 which is joined thereto and serves to close end 108 of the chamber 116 and which defines an opening 148 slidably receiving rod 134 and registers with opening 142 in plate 138. These opening 142 and 148 assist in restricting the movement of the rod 134 along a substantially upright path. To reduce the friction between the rod 134 and the sleeve guide 136 during reciprocating movement of the rod 134, chamber 150 is filled with a suitable friction retardant such as babbit. It will be recognized that an "O" ring or other suitable sealing means may be secured at end 108 of the chamber 116 to assist in preventing liquid from escaping section 116a of chamber 116 through opening 148. Similarly, the opposite ends of chamber 150 may be sealed by "O" rings (not shown) to assist in preventing the lubricant 152 from escaping the confines of the chamber 150 during the sliding movement of the rod 134.

The piston rods 134 for each of the pumping units is actuated for moving the piston head 120 within the cylinder 96 by linkage systems generally indicated at 154 a–l responsive to the rising and falling of waves in the proximity of the opposite sides 156 and 158 of the barge structure. In this connection, the upper end 160 of the piston rod 134 is pivotally connected to end 162 of a level arm 164.

Figure 10:
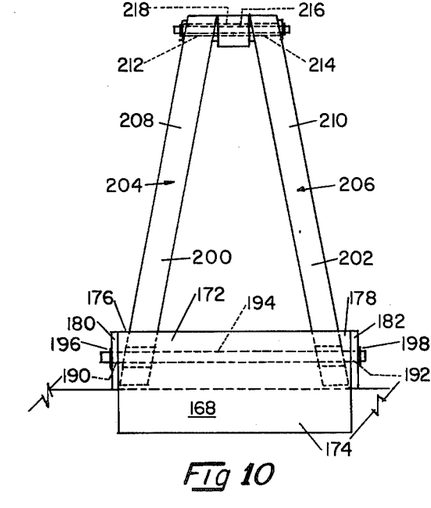
FIG. 10 is a rear elevation view of the fulcrum section of a portion of the linkage system shown in FIG. 1.
Figure 11:
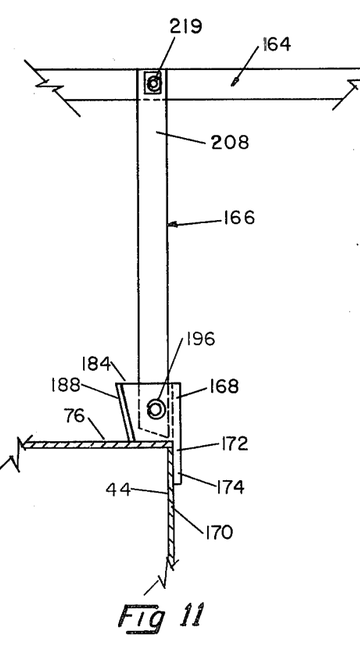
FIG. 11 is a side elevation view of the fulcrum section shown in FIG. 10.
Figure 12:
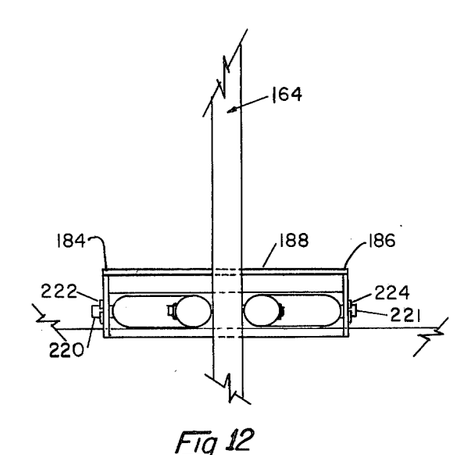
FIG. 12 is a plan view of the fulcrum section shown in FIG. 10.
Figure 13:
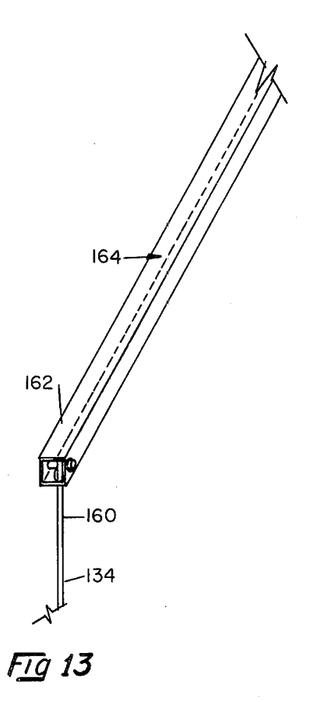
FIG. 13 is a perspective view of a portion of the linkage system.

The lever arm is pivotally supported on the barge structure by a fulcrum section 166 of each of the linkage systems. The illustrated typical fulcrum section 166 (See FIGS. 10–12) comprises a bracket 168 screwed to the marginal edge 170 of the barge structure at a location opposite the position of the associated pumping unit 94. This bracket 168 includes a substantially upright plate 172 plate secured along its lower portion 174 as by welding to the side wall panel 44. The upper portion of the bracket 168 extends above the deck and is joined along its opposite upright end edges 176 and 178 to plates 180 and 182, respectively, which extend substantially perpendicularly from plate 172 and are supported along their lower edges by the deck 76. The distal edges 184 and 186 of these plates 180 and 182 are sloped and joined by a further plate 188 disposed at an acute angle with respect to plate 172 of the bracket 168.

Opposed plates 180 and 182 define registering openings 190 and 192 respectively, which receive a suitable rod or pin 194 secured to its opposite ends by lock rings 196 and 198. This pin 194 serves to pivotably support the ends 200 and 202 of bars 204 and 206, respectively, which converge at their ends 208 and 210 and pivotally support level arm 164. To this end, the ends 208 and 210 of bars 204 and 206, respectively, define registering openings 212 and 214 which receive a pin 216 which extends through opening 219 in the lever arm 164, and which is secured at its opposite ends 220 and 221 by lock rings 222 and 224.

It will be recognized that the lever arm 164 will be displaced horizontally as the piston head 120 is moved along the length of the cylinder 96. To this end, the bracket 168 permits the converging bars 204 and 206 to move in the direction of the horizontal displacement of the level arm 164 with the opposed plates 172 and 188 serving as stops to prevent the bars 204 and 206 from pivoting beyond predetermined limits. The slope of the plate 188 and the portion of the plate 172 serving to stop the pivotal movement of the bars 204 and 206 may be adjusted to increase or reduce the pivotal freedom of the bars 204 and 206 as necessary or desired. Moreover, the slope of the plates serving as stops and the lengths of the rod and lever of the linkage systems can be adjusted to prevent the piston head 120 from striking the closed ends of the chamber 116 during the reciprocating movement of the piston 118.

Each of the lever arms 164 includes a depending section 209 (see the example arm in FIG. 2) that extends substantially perpendicularly from the substantially horizontally disposed arm section 211. In the illustrated embodiment sections 209 and 211 of the lever arm are intregally formed with sufficient strength to withstand the forces exerted on the lever arm bend 212 during pumping operations. To assist in preventing breaking of the arm 164, it may be desirable to provide a brace 214 secured at its opposite ends to sections 211 and 209 of the lever arm respectively.

Figure 8:
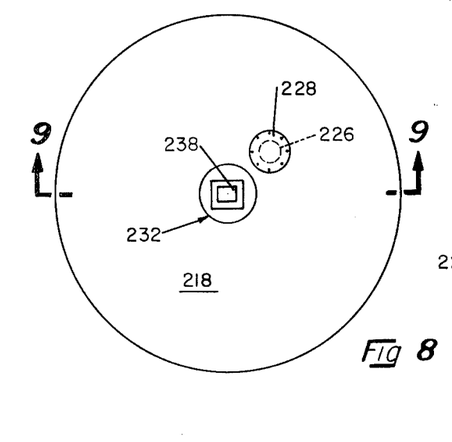
FIG. 8 is a plan view of one of the float members shown in FIG. 1.
Figure 9:
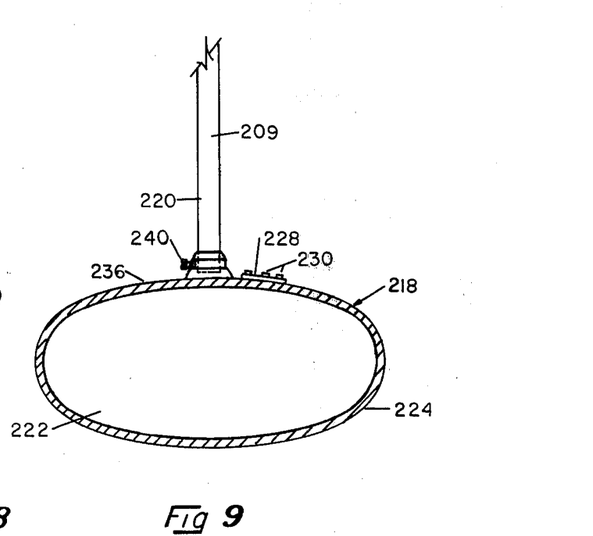
FIG. 9 is a side elevation view of one of the float members shown in FIG. 8.

The lever arm 164 is pivoted responsive to the rising and falling of waves in the water body 12 proximate the barge structure 16. In this connection, float members 218 a–l are secured to each end 220 of the lever arm sections 209. Each float member 218 is fabricated from a suitable water impervious material such as sheet metal which may be folded and welded to form a dome shaped cavity 222 (See FIGS. 8 and 9). The wall 224 of the float member 218 defines an opening 226 which assists in gaining entry into the cavity 222 for purposes of removing condensate, for example. This opening is sealed by a suitable seal 228 secured along its perimeter to the marginal edge of opening 226 by annularly spaced screws 230.

Figure 5:
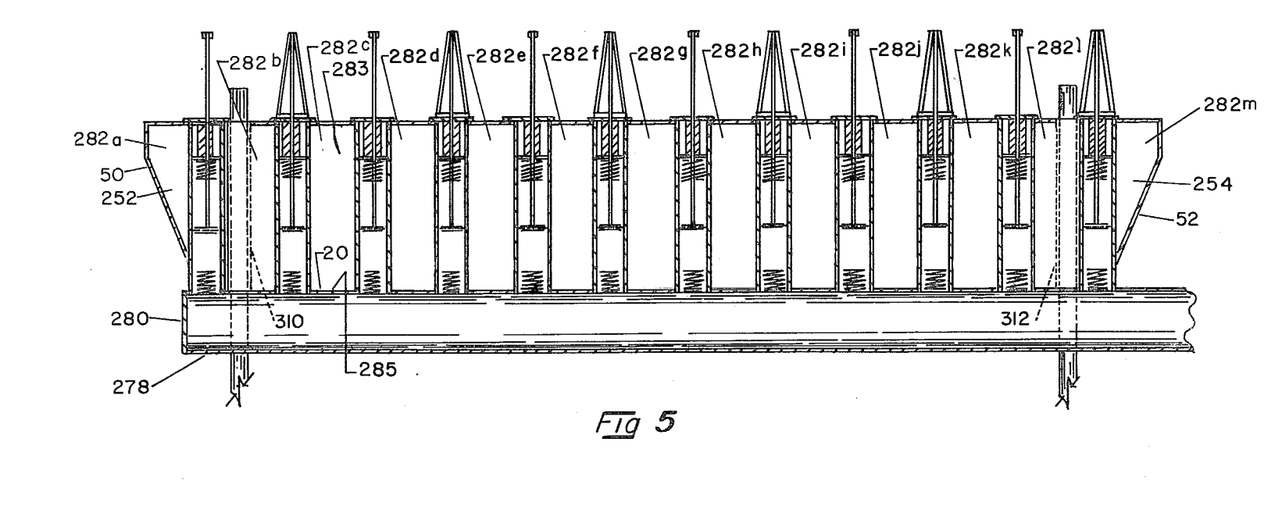
FIG. 5 is a cross sectional view taken along line 5—5 of FIG. 3.

In order to connect the float member 218 with the outboard end 220 of the lever arm 164 a suitable bracket 232 is secured along its lower surface 234 (See FIG. 5) to the outer surface 236 of the float member wall 224 substantially at the central portion of the float member 218 as seen from above. This bracket 232 is provided with a recess 238 which is adapted for receiving the end portion 220 of lever arm section 209 which is secured therein by welding or suitable set screws 240.

Each of the cylinders 96 a–j are disposed within a bulkhead 242 which serves to contain water introduced into the cylinders and to receive water which is pumped from the cylinders during pumping operations. More specifically, the bulkhead 242 (See FIG. 6) comprises opposed panels 244 and 246 which are secured along their respective upper margins 248 and 250 to the underside of the deck 76 at substantially equal distances from the opposite sides of the aligned cylinders 96. The opposite ends 252 (See FIG. 5) and 254 of the bulkhead are closed by the opposite end walls 50 and 52 of the hull 18. The lower portion of each of the panels 244 and 246 is secured along their respective surfaces 256 and 258 to edges 260 and 262 of the lower hull wall 20 which defines an elongated opening 264 proportioned for receiving the bulkhead 242 therethrough. The lower portion 266 of the bulkhead 242 extends below the lower wall 20 of the hull 18 and is closed along its lower end 268 by a manifold collection discharge conduit or pipe 270, described in greater detail hereinafter, and which is welded along the outer surface of its wall 272 to the lower edges 274 and 276 of the bulkhead panels 244 and 246. End 278 of discharge pipe 270 is closed by a substantially circular plate 280 which assists in preventing water from escaping this end of the pipe 270.

Adjacent cylinders disposed within the bulkhead 242 are joined by substantially upright panels 282 which are joined along their upper edge and lower edge 283 and 285, respectively, to the underside of the deck 76 and the outer surface of the wall 272 of the discharge conduit 270. Upright panels 282a and 282m serve to join cylinders 96a and 96l with the end walls 50 and 52, respectively.

It will be recognized that these panels 282a–m and the cylinders serve to divide the bulkhead into separate chambers 284 and 286. Bulkhead chamber 284 serves as an intake manifold through which water enters the bulkhead 242 and the cylinders 96a–l. In this connection, the lower portion of panel 244 is provided with a plurality of openings 289 porvided at spaced locations along the length of the panel 244 which provide fluid communication between the intake manifold 284 and the water body 12.

Water entering the intake manifold or bulkhead chamber 284 is introduced into each of the cylinders through intake valves pairs 288 and 290 disposed at opposite ends of the cylinder 96 (See FIG. 6), and which serve to selectively open close spaced apart opening in the cylinder wall 98. These valve pairs 288 and 290 are conventional one way valves such as check or swing check valves designed to provide fluid communication between the intake manifold 284 and the sections 116a and 116b of the cylinder chamber 116, respectively, on the intake strokes of the piston head 120 with respect to the associated chamber section. During the exhaust strokes of the piston head 120 the valves 288 and 290 close to prevent water from escaping from the sections 116a and 116b of the chamber 116 and re-entering the intake manifold.

It will be recognized that water entering the intake manifold 284 through openings 289 rises to load line 292 which is substantially equivalent to the level of the water adjacent the outer margins of the barge structure. In this connection, the barge structure and weight carried thereby is designed such that the load line 292 is disposed above the intake valve pair 288 of each of the pumping units to the end that water enters the section 116a of the chamber 116 on the downward stroke of piston 118, i.e., the intake stroke and exhaust stroke of chamber sections 116a and 116b, respectively.

Chamber 286 of the bulkhead 242 serves as a discharge manifold and collects water pumped through the exhaust valve pairs 294 and 296 during the exhaust stroke of the piston 118 with respect to the chamber sections 116a and 116b. During the intake stroke with respect to sections 116a and 116b of the piston 118, the associated valves 294 and 296 close to enhance the force with which water is drawn through the intake valve pairs and to assist in preventing water from flowing back into the cylinder 96 from the discharge manifold 286.

Figure 7:
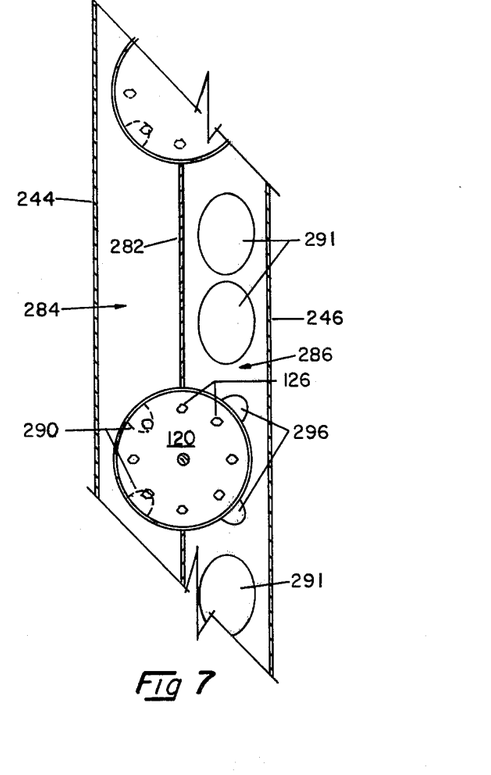
FIG. 7 is a plan view taken along line 7—7 of FIG. 6.

Water exiting the exhaust valve pairs 294 and 296 is collected in the exhaust manifold and enters the manifold collection discharge pipe 270 through a plurality of openings 291 defined at spaced locations along the length of discharge pipe wall (See FIG. 7) and is pumped through the discharge pipe 270 to its opposite end 292 where the water is introduced into the reservoir 90. It wil be recognized that during pumping operations water is maintained under pressure within the discharge manifold 286 and the discharge pipe 270. In this connection, as the float members 218 are displaced vertically responsive to the rising and falling of waves; water is forced under pressure into the discharge manifold 286 thereby forcing a substantially equal volume of water from end 292 of the discharge conduit 270 into the reservoir 90.

The force required to force water from the end 292 of the discharge pipe 270 responsive to the vertical movement of the float members will depend in part upon the elevation of the reservoir 90 with respect to the pumping apparatus 10 and the weight of the water in the discharge pipe. In this connection, the weight of the float members 218 may be set at predetermined values to assure proper pumping upon movement of the float member downwardly, thereby forcing water from valves 294, in response to the passage of a wave. Similarly, the upward force produced by the rising of the float members may be set at a predetermined value by controlling the bouyancy of the float members.

In the illustrated embodiment, distal end 292 of the discharge pipe 270 which serves to discharge water into the reservoir 90 is disposed above the level of the water 91 in the reservoir. In this connection, the force required to pump water from the water body 12 to the reservoir 90 is reduced inasmuch as the weight of the water in the reservoir does not cause back pressure within the discharge pipe 270 which would be occasioned if water were introduced into the reservoir below the level of the contained water 91.

Figure 14:
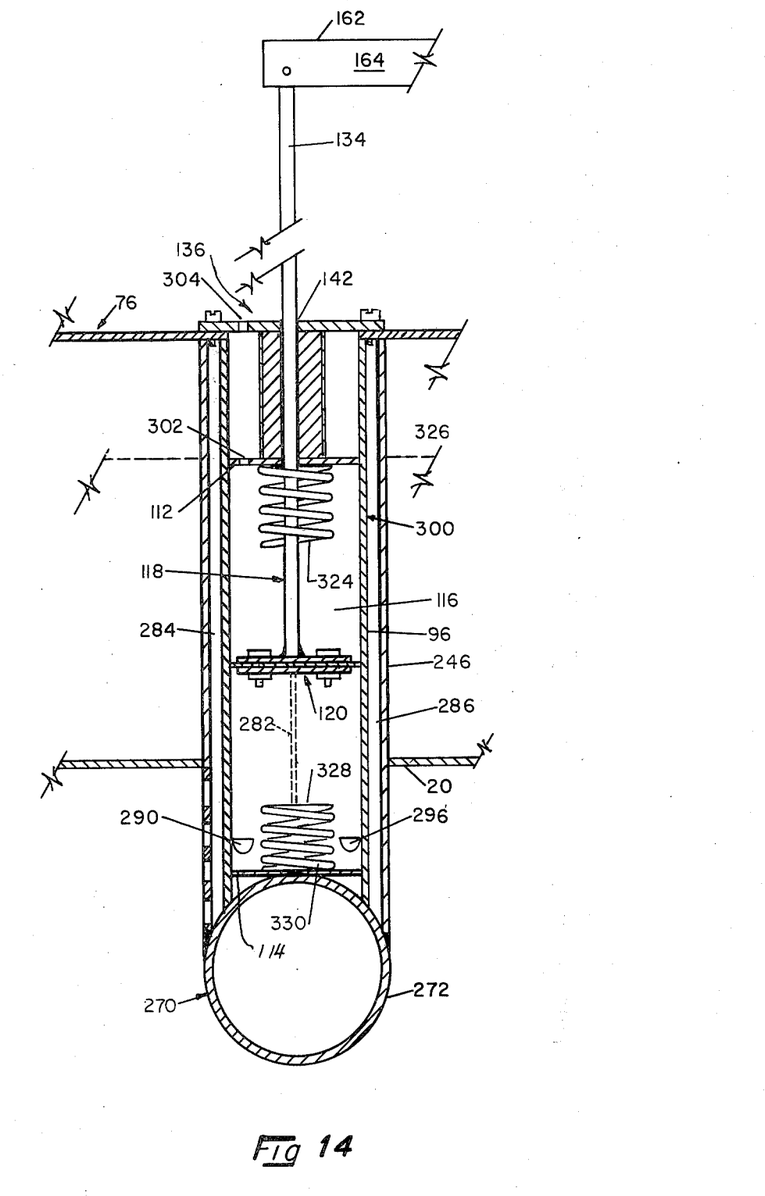
FIG. 14 is a cross sectional view of an alternate pumping unit.

In certain applications, it may be desirable to utilize single action pumping units, such as the unit generally indicated at 300 in FIG. 14. The pumping unit shown in FIG. 14 is similar to the double action pump units shown in FIGS. 2, 5 and 6 and like reference numerals are used to indicate like parts. Water is drawn into the single action pumping unit 300 through the intake valve pair 290 providing fluid communication between section 116b of chamber 116 and the intake manifold 284. More specifically, these valves 290 are mounted at spaced locations on the cylinder 96 and open to allow water to enter the chamber section 116b on the intake stroke of the piston 118, i.e., during its upward vertical movement as shown in FIG. 14. During the downward or exhaust stroke of the piston 118, valves 290 close to prevent water from re-entering the intake manifold, and valve pair 296 opens as water is forced through the openings associated with the valves and into the discharge manifold 286.

During the intake strokes, valves 296 are closed and any gases trapped in chamber section 116b can escape through openings 302 and 304 provided in plate 112 closing the chamber 116 at its upper end and the rod sleeve guide plate 138, respectively.

Suitable springs 324 and 328 are mounted at their ends 326 and 330 (See FIGS. 6 and 14) on the plates 112 and 114, respectively, as by welding. These springs extend into the chamber sections 116b and 116a, respectively, and engage the piston head 120 as it approaches the opposite ends 108 and 110 of the chamber 116 to assist in preventing the piston head 120 from striking the plates 112 and 114 and further assist in reciprocating the piston head along the cylinder length.

It will be recognized that the thrust stroke which forces water into the exhaust manifold is associated with float member 218 rising responsive to a wave passing thereunder. As the float member falls to its still water position, under the force of gravity, water is drawn into the chamber section 116b. By eliminating the necessity of producing enough force within the pumping units, to force water through the manifold collection discharge pipe 270 as the float members fall to their still water positions, the weight of such float members may be reduced.

In order to moor the pumping apparatus, suitable spud well pairs 310 and 312 are provided at spaced locations at opposite ends 46 and 48 of the barge structure 16. Each of the illustrated spud wells comprise elongated cylindrical sleeves 314 (See spud well 312a FIG. 2) which extends through suitable registering openings provided in the barge deck 76 and lower wall 20. The opposite ends 316 and 318 of the sleeves are flared and sealably engage the margins of the openings provided in the deck 76 and lower barge wall 20 to assist in preventing water from entering the barge structure. As necessary or desired, suitable seals may be provided to assist in preventing water from entering the interior 311 of the barge structure.

Each of the spud well pairs 310 and 312 are adapted for slidably receiving the upper end of posts 320 anchored at their respective lower ends (not shown) in the floor of the water body 12. The posts 320 and spud wells 310 and 312 cooperate to enable the pumping apparatus 10 to change vertical positions responsive to changes in the level of the water 23, as may be caused by the changing of the tide for example. However, the posts and wells serve to effectively anchor the pumping apparatus 10 against sudden changes in the vertical position of the barge apparatus 10 which would otherwise be occasioned by the rising and falling of the waves. In this connection, the barge structure 16 is effectively anchored while the float members 218 are free to vary in respect to their vertical positions for purposes of pumping water through the discharge pipe 270.

Suitable tie downs 315 are mounted in pairs at opposite ends of the barge structure for anchoring the pumping apparatus to a shore line or dock for example as necessary or desired.

From the foregoing detailed description, it will be recognized that a pumping apparatus has been disclosed which incorporates certain advantageous features enabling utilization of the energy produced by waves at the surface of large bodies of water. More specifically, the illustrated pumping apparatus serves to pump liquid or water in which the pumping apparatus is disposed to a remote location which is preferably positioned at a higher vertical location than the pumping apparatus. In this connection, liquid contained in the reservoir may be mechanically released through a turbine generating system, for example, to create electrical energy. To this end, the pumping apparatus employs a plurality of independently operating pumping units which are randomly actuated by the rising and falling of float members connected to a piston head slidably disposed within the pumping units. The pumping units are serially aligned and operate jointly to force liquid through a common discharge pipe which serves to direct the water into a suitable elevated reservoir. As necessay or desired, additional pumping units may be mounted on the barge structure which may be extended in length, in communication with the discharge pipe to enhance the pumping capacity of the system. Accordingly, the pumping apparatus may be constructed in sections.

It will be recognized, that the pumping apparatus when moored in a large fresh water lake having substantial wave activity may be used as an irrigation device.

While a preferred embodiment has been shown and described, it will be understood that there is no intent to limit the invention by such disclosure, but rather, it is intended to cover all modifications and alternate constructions falling within the spirit and scope of the invention as defined in the appended claims.

I claim:

1. A hydraulic engine apparatus for pumping water within which said apparatus is disposed to a location remote to said apparatus comprising:
    a barge structure being bouyant and floating at the surface of said water, said barge structure including a hull and a deck, said deck being mounted on said hull in a substantially horizontal position;
    a pumping system carried by said barge structure, said pumping system including a plurality of pumping units mounted in fluid communication with said water,
    float members associated with each of said pumping units, each of said float members having disposed in said water proximate said barge structure, said float members rising and falling independently responsive to the movement of waves proximate said float members,
    linkage means interconnecting each of said float members and at least one of said pumping units, whereby the rising and falling of said float members serves to actuate said pumping units,
    discharge pipe means mounted in fluid communication with each of said pumping units for receiving water discharged by said pumping units, said discharge pipe means extending to said remote location, whereby actuation of said pumping units responsive to the rising and falling of waves in said water serves to pump water through said discharge pipe means, said pumped water being discharged at said remote location,
    each of said pumping units includes a cylinder defined by a substantially cylindrical wall disposed in an upright position, said wall having a first end portion secured to said deck, and a further end portion secured to said discharge pipe, first and further means closing the opposite end portions of said cylinder to define a chamber, a piston having a piston head slidably disposed in said chamber and forming a seal with the wall of said cylinder thereby dividing said chamber into first and further sections, and a rod connected at one of its ends with said piston head, the opposite end of said piston rod being connected to said linkage means, intake valve means providing selective fluid communication between said water and at least one of said chamber sections, discharge valve means providing selective fluid communication between at least one of said chamber sections and said discharge pipe whereby the rising and falling of said float members serves to reciprocate said piston head along said cylinder and pump water into said discharge pipe means and
    bulkhead means mounted on said barge structure and partially enclosing said pumping units, said
    bulkhead means including an intake manifold section which contains water at a level above the level of said intake valve means and a discharge manifold section which receives water discharged through said exhaust valve means, said discharge manifold section communicating with the interior of said discharge pipe means whereby water pumped from said pumping units enters said discharge manifold section and is directed into said discharge pipe means.

2. A hydraulic engine apparatus for pumping water within which said apparatus is disposed to a location remote to said apparatus comprising:
    a barge structure being bouyant and floating at the surface of said water, said barge structure including a hull and a deck, said deck being mounted on said hull in a substantially horizontal position;
    a pumping system carried by said barge structure, said pumping system including a plurality of pumping units mounted in fluid communication with said water,
    float members associated with each of said pumping units, each of said float members being disposed in said water proximate said barge structure, said float members rising and falling independently responsive to the movement of waves proximate said float members,
    linkage means interconnecting each of said float members and at least one of said pumping units, whereby the rising and falling of said float members serves to actuate said pumping units, said linkage means includes a plurality lever arms, each of said lever arms being pivotally connected at one of its ends with one of said pumping units and connected at its opposite end with one of said float members, and a fulcrum section pivotally supporting each of said lever arms on said barge structure each of said fulcrum sections includes bar means pivotally connected at one of its ends with lever arm and bracket means mounted on said barge structure and pivotally supporting said bar means said bracket means including first and further stop means serving to limit the pivotal movement of said bar means within a predetermined range of movement, and
    discharge pipe means mounted in fluid communication with each of said pumping units for receiving water discharged by said pumping units, said discharge pipe means extending to said remote location, whereby actuation of said pumping units responsive to the rising and falling of waves in said water serves to pump water through said discharge pipe means, said pumped water being discharged at said remote location.

* * * * *